(12) United States Patent
Wang

(10) Patent No.: US 10,491,874 B2
(45) Date of Patent: *Nov. 26, 2019

(54) IMAGE PROCESSING METHOD AND DEVICE, COMPUTER-READABLE STORAGE MEDIUM

(71) Applicant: GUANGDONG OPPO MOBILE TELECOMMUNICATIONS CORP., LTD., Dongguan, Guangdong (CN)

(72) Inventor: Huichao Wang, Dongguan (CN)

(73) Assignee: GUANGDONG OPPO MOBILE TELECOMMUNICATIONS CORP., LTD, Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,146

(22) Filed: Oct. 3, 2018

(65) Prior Publication Data
US 2019/0199990 A1   Jun. 27, 2019

(30) Foreign Application Priority Data
Dec. 25, 2017 (CN) .......................... 2017 1 1420294

(51) Int. Cl.
H04N 9/73 (2006.01)
G02B 27/64 (2006.01)
H04N 5/225 (2006.01)

(52) U.S. Cl.
CPC .......... *H04N 9/735* (2013.01); *G02B 27/646* (2013.01); *H04N 5/2259* (2013.01)

(58) Field of Classification Search
None
See application file for complete search history.

(56) References Cited

U.S. PATENT DOCUMENTS 5,283,635 A      2/1994  Suzuki
7,148,920 B2 *  12/2006  Aotsuka ................. H04N 5/335
                                                          348/223.1
(Continued)

FOREIGN PATENT DOCUMENTS

CN    1678081 A    10/2005
CN    102209246 A  10/2011
(Continued)

OTHER PUBLICATIONS

International Search Report in international application No. PCT/CN2018/106057, dated Nov. 29, 2018.
(Continued)

Primary Examiner — Cynthia Segura
(74) Attorney, Agent, or Firm — Ladas & Parry, LLP

(57) ABSTRACT

An image processing method is provided. The image processing method includes: each frame of image in multiple continuous frames of images is processed to determine a number of light sources of each frame of image; it is determined whether a difference between a number of light sources of a kth frame of image and a number of light sources of a (k+1)th frame of image is equal to 0; and when the difference is unequal to 0, a color temperature of the (k+1)th frame of image is determined to be a color temperature of the kth frame of image and the (k+1)th frame of image is processed according to the color temperature of the (k+1)th frame of image. An image processing device, a computer-readable storage medium and a computer device are further provided.

20 Claims, 13 Drawing Sheets

(56) References Cited

U.S. PATENT DOCUMENTS

| | | | |
|---|---|---|---|
| 9,402,063 B2 | 7/2016 | Kuchiki | |
| 10,154,256 B1* | 12/2018 | Segapelli | H04N 17/002 |
| 2003/0098916 A1* | 5/2003 | Noguchi | H04N 9/735 |
| | | | 348/272 |
| 2005/0122409 A1* | 6/2005 | Takeshita | H04N 1/6027 |
| | | | 348/223.1 |
| 2005/0195290 A1* | 9/2005 | Takeshita | H04N 9/735 |
| | | | 348/223.1 |
| 2005/0264701 A1* | 12/2005 | Huh | H04N 9/73 |
| | | | 348/655 |
| 2006/0182338 A1* | 8/2006 | Toyoda | H04N 1/4074 |
| | | | 382/167 |
| 2007/0091184 A1 | 4/2007 | Wang | |
| 2008/0278601 A1 | 11/2008 | Goel | |
| 2010/0053222 A1* | 3/2010 | Kerofsky | G09G 3/3406 |
| | | | 345/690 |
| 2010/0188588 A1* | 7/2010 | Sato | H04N 9/3111 |
| | | | 348/744 |
| 2012/0127336 A1* | 5/2012 | Uezono | H04N 5/2356 |
| | | | 348/223.1 |
| 2013/0128073 A1* | 5/2013 | Seok | H04N 9/735 |
| | | | 348/223.1 |
| 2014/0175987 A1* | 6/2014 | Lai | H05B 33/0869 |
| | | | 315/151 |
| 2015/0271460 A1* | 9/2015 | Jung | H04N 9/735 |
| | | | 348/225.1 |
| 2015/0350620 A1 | 12/2015 | Kuchiki | |
| 2019/0132563 A1* | 5/2019 | Wang | H04N 9/73 |
| 2019/0132564 A1* | 5/2019 | Wang | H04N 9/735 |
| 2019/0132566 A1* | 5/2019 | Wang | H04N 1/6027 |
| 2019/0253683 A1* | 8/2019 | Zhu | H04N 9/045 |

FOREIGN PATENT DOCUMENTS

| | | |
|---|---|---|
| CN | 105578166 A | 5/2016 |
| CN | 105959661 A | 9/2016 |
| CN | 106162135 | 11/2016 |
| CN | 106973242 A | 7/2017 |
| CN | 107872663 A | 4/2018 |
| JP | 2015204532 A | 11/2015 |

OTHER PUBLICATIONS

Written Opinion of the International Search Authority in international application No. PCT/CN2018/106057, dated Nov. 29, 2018.
Supplementary European Search Report in the European application No. 18195967.7, dated May 10, 2019.

* cited by examiner

IMAGE PROCESSING METHOD AND DEVICE, COMPUTER-READABLE STORAGE MEDIUM

CROSS-REFERENCE TO RELATED APPLICATION

The present application claims priority to Chinese Patent Application 201711420294.3, filed on Dec. 25, 2017, the contents of which are hereby incorporated by reference in its entirety.

BACKGROUND

The disclosure relates to the technical field of image processing, and particularly to an image processing method, an image processing device, a computer-readable storage medium and a computer device.

According to an image method in the related art, a preview image is processed to detect a light source and white balance processing is performed according to a color of the light source. However, when a lens shakes, a field of view may jump to change a distribution of the light source in the preview image and further cause a tone of the preview image subjected to white balance correction to jump. For example, shaking of the lens makes the light source or part of the light source in and out randomly, destabilizes a white balance processing effect and affects a user experience.

SUMMARY

Embodiments of the disclosure provide an image processing method, an image processing device, a computer device and a computer-readable storage medium.

According to a first aspect, the embodiments of the disclosure provide an image processing method, which may include the following operations. Each frame of image in multiple continuous frames of images is processed to determine the number of light sources of each frame of image. It is determined whether a difference between a number of light sources of a kth frame of image and a number of light sources of a continuous (k+1)th frame of image is equal to 0. Responsive to determining that the difference is unequal to 0, a color temperature of the (k+1)th frame of image is determined to be a color temperature of the kth frame of image and the (k+1)th frame of image is processed according to the color temperature of the (k+1)th frame of image.

According to a second aspect, the embodiments of the disclosure provide an image processing device. The image processing apparatus may include a memory and a processor. The memory stores one or more computer programs that, when executed by the processor, cause the processor to implement the image processing method described in the first aspect.

According to a third aspect, the embodiments of the disclosure provide a non-transitory computer-readable storage medium including a computer-executable instruction. The computer-executable instruction may be executed by one or more processors to enable the processor to execute the image processing method described in the first aspect.

The computer device according to the embodiments of the disclosure may include a memory and a processor. The memory may store a computer-readable instruction, and the instruction may be executed by the processor to enable the processor to execute the image processing method.

Additional aspects and advantages of the disclosure will be partially presented in the following descriptions and partially become apparent from the following descriptions or get understood by implementing the disclosure.

BRIEF DESCRIPTION OF DRAWINGS

In order to describe the technical solutions in the embodiments of the disclosure or a conventional art more clearly, the drawings required to be used in descriptions about the embodiments or the conventional art will be simply introduced below. It is apparent that the drawings described below are only some embodiments of the disclosure. Other drawings may further be obtained by those of ordinary skill in the art according to these drawings without creative work.

DETAILED DESCRIPTION

According to the image processing method and device, computer-readable storage medium and computer device of the embodiments of the disclosure, it is determined whether the number of the light sources between two continuous frames of images in the multiple continuous frames of images changes. After the number of the light sources changes, white balance regulation is performed on the latter frame of image according to a color temperature of the former frame of image. When the number of the light sources does not change, white balance regulation is performed on the image by use of a color temperature of the image. In such a manner, image tone jump caused by the fact that shaking of a lens makes the light sources or part of the light sources in and out randomly may be prevented, stability of a white balance processing effect is ensured, and a user experience is improved.

In order to make the purposes, technical solutions and advantages of the disclosure clearer, the disclosure will further be described below in combination with the drawings and the embodiments in detail. It should be understood that specific embodiments described herein are only adopted to explain the disclosure and not intended to limit the disclosure.

Figure 1:
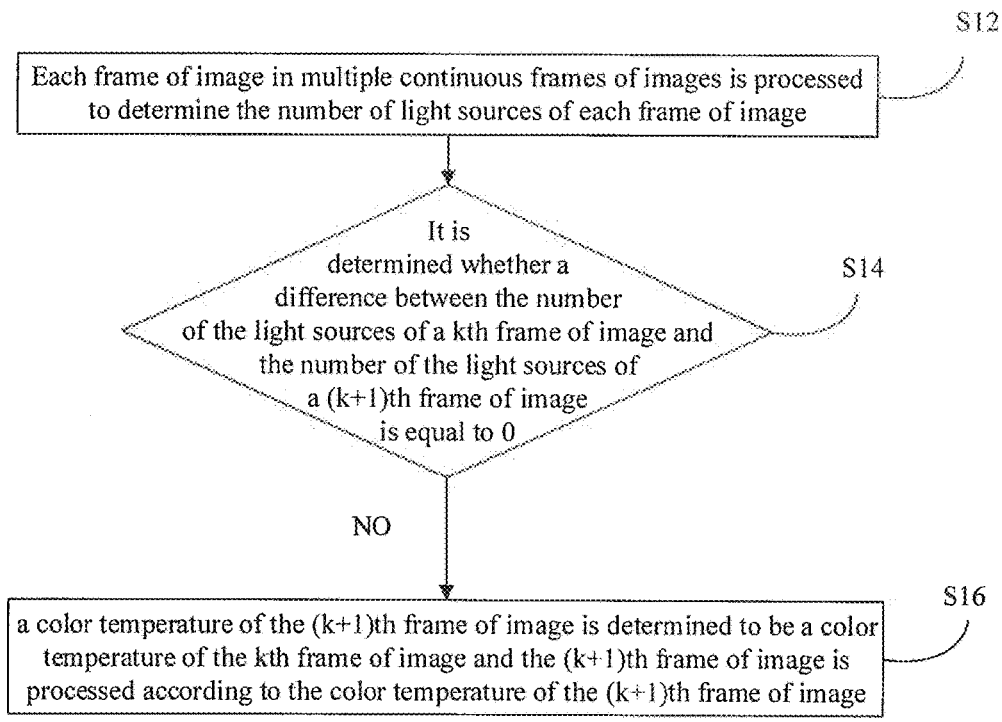
FIG. 1 is a flowchart of an image processing method according to some embodiments of the disclosure.

Referring to FIG. 1, an image processing method according to the embodiments of the disclosure includes the following operations at blocks S12 to S16.

At block S12, each frame of image in multiple continuous frames of images is processed to determine the number of light sources of each frame of image.

At block S14, it is determined whether a difference between the number of the light sources of a kth frame of image and the number of the light sources of a (k+1)th frame of image is equal to 0.

At block S16, responsive to determining that the difference is unequal to 0, a color temperature of the (k+1)th frame of image is determined to be a color temperature of the kth frame of image and the (k+1)th frame of image is processed according to the color temperature of the (k+1)th frame of image.

In the embodiments of the disclosure, k may be a positive integer.

Figure 2:
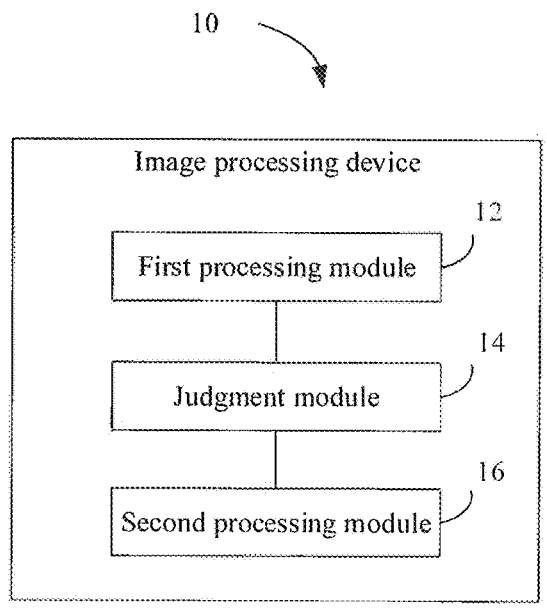
FIG. 2 is a schematic diagram of an image processing device according to some embodiments of the disclosure.

Referring to FIG. 2, an image processing device 10 according to the embodiments of the disclosure includes a first processing module 12, a judgment module 14 and a second processing module 16. The first processing module 12 is configured to process each frame of image in multiple continuous frames of images to determine the number of light sources of each frame of image. The judgment module 14 is configured to judge whether a difference between the number of the light sources of a kth frame of image and the number of the light sources of a (k+1)th frame of image is equal to 0. The second processing module 16 is configured to, responsive to determining that the difference is unequal to 0, determine a color temperature of the (k+1)th frame of image to be a color temperature of the kth frame of image and process the (k+1)th frame of image according to the color temperature of the (k+1)th frame of image.

The image processing method according to the embodiments of the disclosure may be implemented by the image processing device 10 of the embodiments of the disclosure. The operation at block S12 may be implemented by the first processing module 12, the operation at block S14 may be implemented by the judgment module 14 and the operation at block S16 may be implemented by the second processing module 16.

Figure 3:
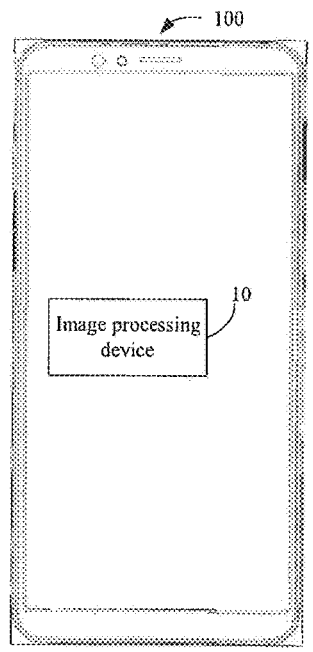
FIG. 3 is a schematic plan view of a computer device according to some embodiments of the disclosure.

Referring to FIG. 3, the image processing device 10 according to the embodiments of the disclosure may be applied to a computer device 100 of the embodiments of the disclosure. That is, the computer device 100 of the embodiments of the disclosure may include the image processing device 10 of the embodiments of the disclosure.

In some embodiments, the computer device 100 includes a mobile phone, a tablet computer, a notebook computer, a smart band, a smart watch, a smart helmet, smart glasses and the like.

According to the image processing method, image processing device 10 and computer device 100 of the embodiments of the disclosure, it is determined whether the number of the light sources between two continuous frames of images in the multiple continuous frames of images changes, after the number of the light sources changes, white balance regulation is performed on the latter frame of image according to a color temperature of the former frame of image, and when the number of the light sources does not change, white balance regulation is performed on the image by use of a color temperature of the image. In such a manner, image tone jump caused by the fact that shaking of a lens makes the light sources or part of the light sources in and out randomly may be prevented, thereby ensuring stability of a white balance processing effect and improving the user experience.

In some embodiments, the multiple continuous frames of images refer to multiple continuous frames of images obtained by continuously arranging, along a time axis, multiple frames of images obtained at fixed time intervals according to a frame rate of a camera within a period of time.

Figure 4:
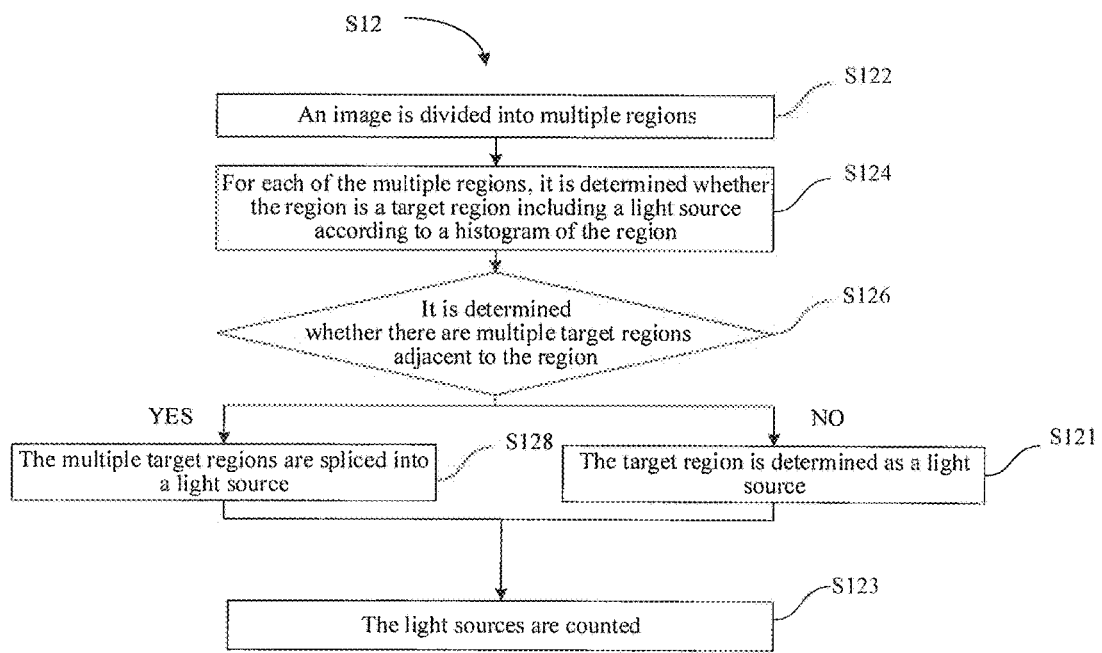
FIG. 4 is a schematic flowchart of an image processing method according to some embodiments of the disclosure.

Referring to FIG. 4, in some embodiments, the operation at block S12 includes the following actions at blocks S122 to S128.

At block S122, each frame of image is divided into multiple regions.

At block S124, for each of the multiple regions, it is determined whether the region is a target region including a light source according to a histogram of the region.

At block S126, when the region is the target region including a light source, it is determined whether there are multiple target regions adjacent to the region.

At block S128, when there are multiple target regions adjacent to the region, the multiple target regions are spliced into a light source.

At block S121, when there are no target regions adjacent to the region, the target region is determined as a light source.

At block S123, the light sources are counted.

Figure 5:
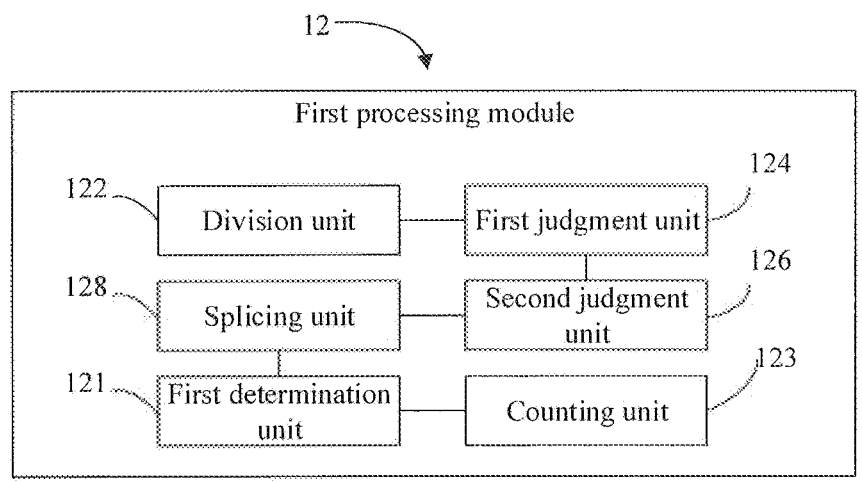
FIG. 5 is a schematic diagram of a first processing module according to some embodiments of the disclosure.

Referring to FIG. 5, in some embodiments, the first processing module 12 includes a division unit 122, a first judgment unit 124, a second judgment unit 126, a splicing unit 128, a first determination unit 121 and a counting unit 123. The division unit 122 may be configured to divide an image into multiple regions. The first judgment unit 124 may be configured to, for each of the multiple regions, judge whether the region is a target region including a light source according to a histogram of the region. The second judgment unit 126 may be configured to judge whether there are multiple target regions adjacent to the region. The splicing unit 128 may be configured to, when there are multiple target regions adjacent to the region, splice the multiple target regions into a light source. The first determination unit 121 may be configured to, when there are no target regions adjacent to the region, determine the target region as a light source. The counting unit 123 may be configured to count the light sources.

That is, the operation at block S122 may be implemented by the division unit 122, the operation at block S124 may be implemented by the first judgment unit 124, the operation at block S126 may be implemented by the second judgment unit 126, the operation at block S128 may be implemented by the splicing unit 128, the operation at block S121 may be implemented by the first determination unit 121 and the operation at block S123 may be implemented by the counting unit 123.

In such a manner, positions and number of the light sources in the image may be determined.

Figure 6:
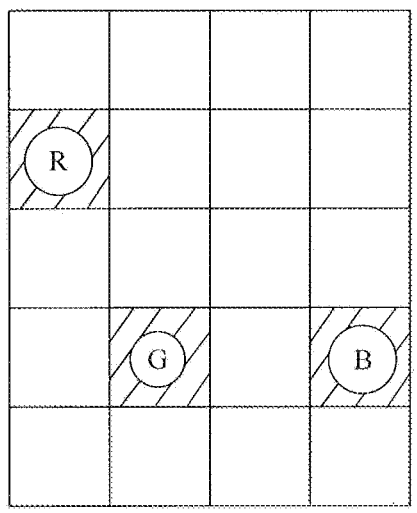
FIG. 6 is a schematic diagram of a scenario of an image processing method according to some embodiments of the disclosure.
Figure 7:
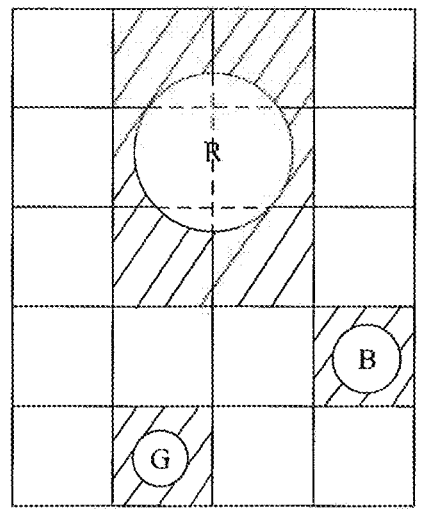
FIG. 7 is a schematic diagram of a scenario of an image processing method according to some embodiments of the disclosure.
Figure 8:
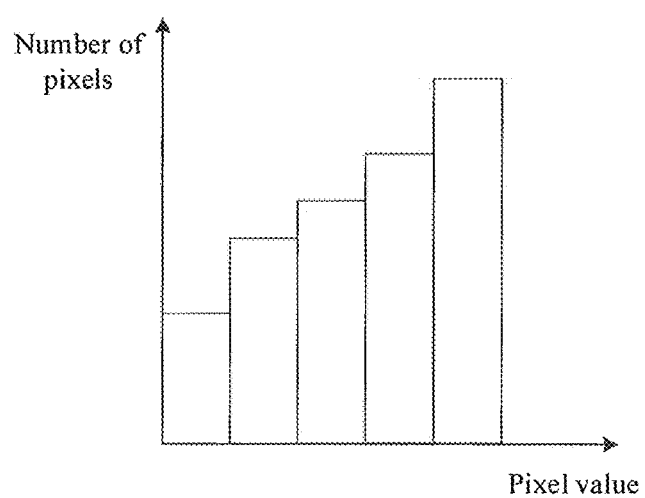
FIG. 8 is a histogram formed by a region in an image processing method according to some embodiments of the disclosure.

Specifically, referring to FIG. 6 to FIG. 8, in an embodiment, according to the image processing method, each frame of image is divided into multiple regions at first, for example, 4*5 regions. Four histograms may be drawn for each region according to channel values of Red (R), Green (Gr), Greenish Blue (Gb) and Blue (B). Then, it is determined for each region whether the region is a target region including a light source according to the four histograms of the region. As illustrated in FIG. 6 and FIG. 7, both of images include multiple target regions. For example, the image in FIG. 6 includes three target regions and the image in FIG. 7 includes eight target regions. According to the image processing method, when there is one region that is the target region including the light source, it is determined whether there are multiple target regions adjacent to the region. That is, it is determined whether multiple target regions are covered by the same light source. The multiple target regions may be covered in a partial coverage or complete coverage manner. According to the image processing method, when there are multiple adjacent target regions, the multiple adjacent target regions are spliced into a light source, and when there are no adjacent target regions, each target region is determined as a light source. Referring to FIG. 6, the three non-adjacent target regions are determined as a light source R, a light source G and a light source B respectively. Referring to FIG. 7, six adjacent target regions are spliced into a complete light source R, and the other two non-adjacent target regions are determined as a light source G and a light source B respectively.

In addition, it is to be noted that the method for drawing a histogram of a region in FIG. 8 is only an example. As illustrated in FIG. 8, an abscissa axis of the histogram represents pixel value and an ordinate axis represents the number of pixels. In another embodiment, the abscissa axis of the histogram may also represent the number of pixels and the ordinate axis may represent pixel value. Alternatively, the abscissa axis of the histogram represents a proportion of the number of pixels and the ordinate axis represents pixel value. Alternatively, the abscissa axis of the histogram represents pixel value and the ordinate axis of the histogram represents the proportion of the number of pixels.

In some embodiments, the determination regarding whether a certain region is a target region including a light source according to a histogram of the region may be made by determining whether a proportion of the number of pixels with pixel values exceeding a predetermined value exceeds a predetermined proportion. For example, the determination may be made by determining whether a proportion of the number of pixels with pixel values exceeding 239 exceeds 5%. When the proportion of the number of the pixels with pixel values exceeding 239 exceeds 5%, it is indicated that the region is a target region including a light source. When the proportion of the number of the pixels with pixel values exceeding 239 does not exceed 5%, it is indicated that the region is not a target region including a light source.

Figure 9:
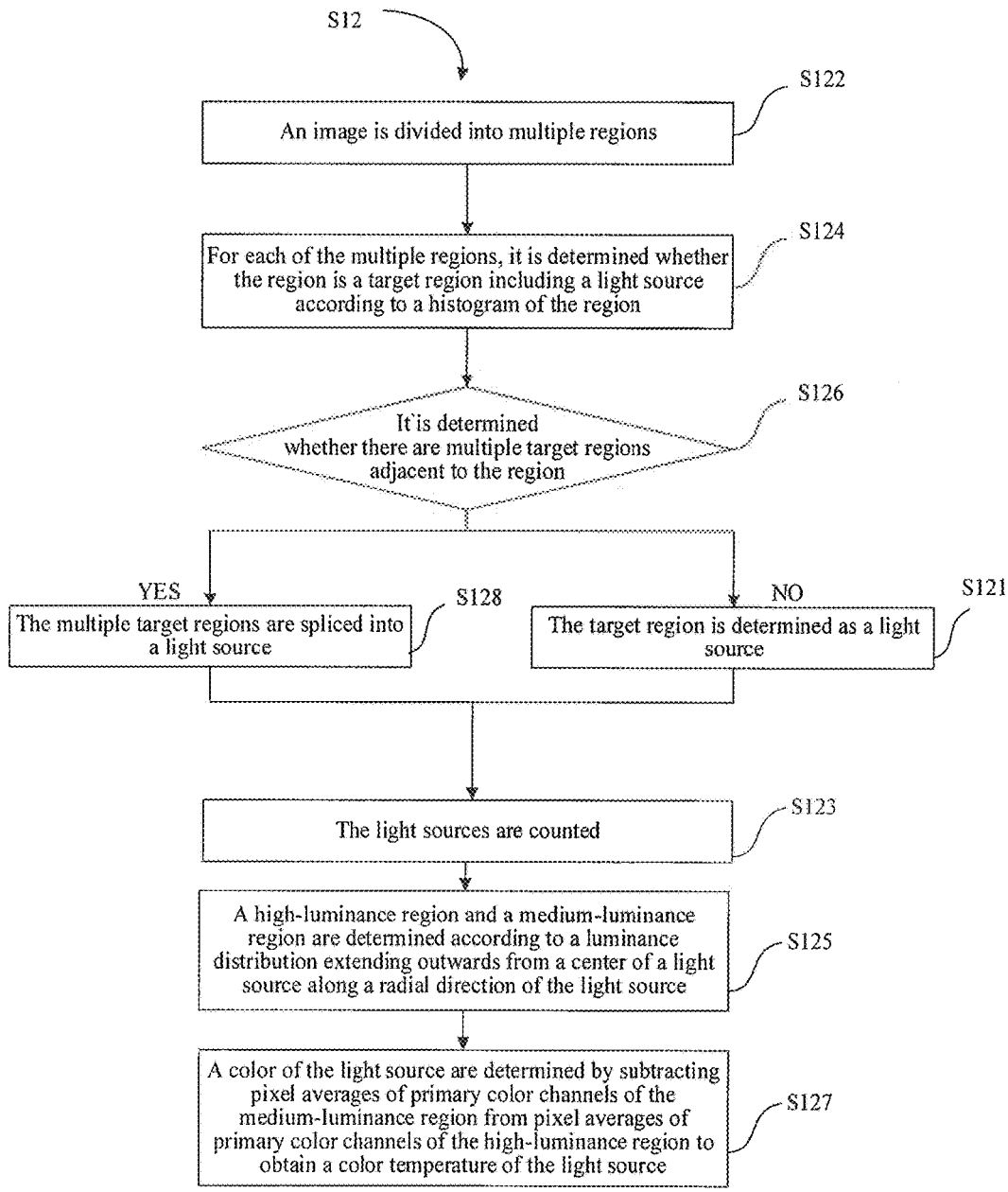
FIG. 9 is a schematic flowchart of an image processing method according to some embodiments of the disclosure.

Referring to FIG. 9, in some embodiments, the operation at block S12 further includes the following actions at blocks S125 to S127.

At block S125, a high-luminance region and a medium-luminance region are determined according to a luminance distribution extending outwards from a center of a light source along a radial direction of the light source.

At block S127, a color of the light source is determined by subtracting pixel averages of primary color channels of the medium-luminance region from pixel averages of primary color channels of the high-luminance region to obtain a color temperature of the light source.

Figure 10:
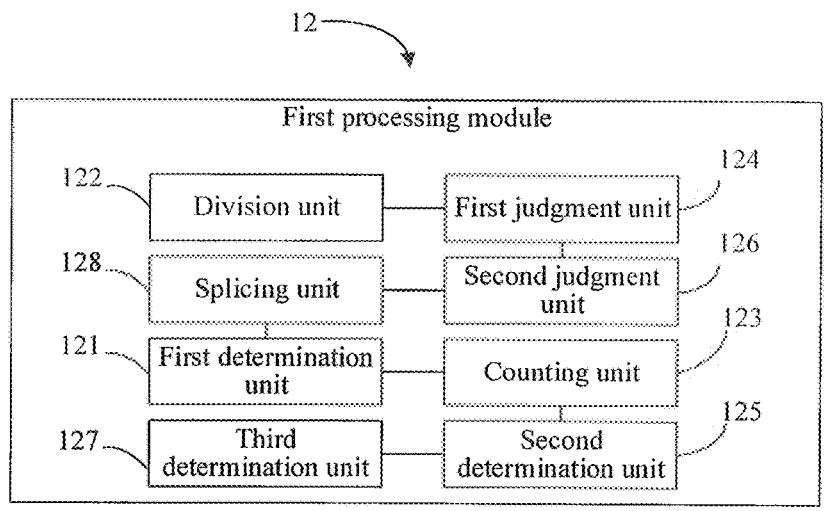
FIG. 10 is a module schematic diagram of a first processing module according to some embodiments of the disclosure.

Referring to FIG. 10, in some embodiments, the first processing module 12 further includes a second determination unit 125 and a third determination unit 127. The second determination unit 125 may be configured to determine a high-luminance region and a medium-luminance region according to a luminance distribution extending outwards from a center of a light source along a radial direction of the light source. The third determination unit 127 may be configured to determine a color of the light source by subtracting pixel averages of primary color channels of the medium-luminance region from pixel averages of primary color channels of the high-luminance region to obtain a color temperature of the light source.

That is, the operation at block S125 may be implemented by the second determination unit 125 and the operation at block S127 may be implemented by the third determination unit 127.

In such a manner, after the position and the number of the light sources in each frame of image are determined, the color of each light source may be determined through the high-luminance regions and the medium-luminance regions, and thus the color temperature of each light source may be obtained. When the number of light sources are more than 1, i.e., there are multiple light sources in the image, the color temperature of a primary light source may be determined according to the colors of the light sources, so that the color temperatures of the light sources may be estimated more accurately.

Figure 11:
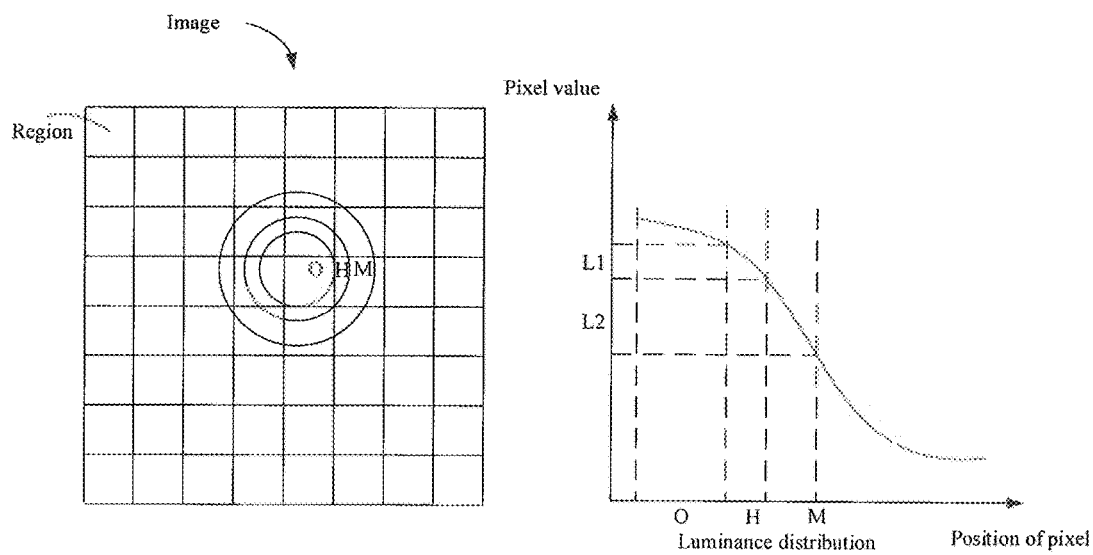
FIG. 11 is a schematic diagram of a scenario of an image processing method according to some embodiments of the disclosure.

Referring to FIG. 11, after a position of a light source in an image is determined, it is to be understood that a central region O of the light source in the image is an overexposed region, which is usually a large white spot and does not include information on a color of the light source. The color of the light source may be determined based on pixel averages of primary color channels of a high-luminance region H and a medium-luminance region M. The high-luminance region H may refer to a region formed by pixels of which luminance values extending outwards radially from a center of the light source are within a first luminance range L1, and the first luminance range L1 is, for example, [200, 239). The medium-luminance region M may refer to a region formed by pixels of which luminance values extending outwards radially from the center of the light source are within a second luminance range L2, and the second luminance range L2 is, for example, [150, 200). It is to be noted that specific values of the first luminance range L1 and the second luminance range L2 may be determined according to a luminance distribution, extending outwards radially from the center O, of the light source. For example, when luminance of the light source is attenuated relatively fast, the first luminance range L1 and the second luminance range L2 may be enlarged. For example, when the luminance of the light source is attenuated relatively slowly, the first luminance range L1 and the second luminance range L2 may be narrowed.

The pixel average of the primary color channel of the high-luminance region is an average of pixel values of all pixels of the high-luminance region, and the pixel average of the primary color channel of the medium-luminance region is an average of pixel values of all pixels of the medium-luminance region. Assume that the number of the pixels of the high-luminance region is C1 and the number of the pixels of the medium-luminance region is C2. Then, the pixel average of the primary color channel of the high-luminance region is:

$$\overline{H} = \frac{\left(\sum_1^{C1} R, \sum_1^{C1} G, \sum_1^{C1} B\right)}{C1},$$

and the pixel average of the primary color channel of the medium-luminance region is:

$$\overline{M} = \frac{\left(\sum_1^{C2} R, \sum_1^{C2} G, \sum_1^{C2} B\right)}{C2}.$$

Figure 12:
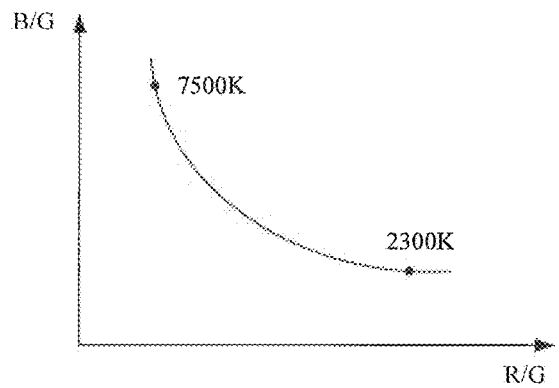
FIG. 12 is a schematic diagram of a color temperature curve according to some embodiments of the disclosure.

The pixel average $\overline{M}$ of the primary color channel of the medium-luminance region is subtracted from the pixel average $\overline{H}$ of the primary color channel of the high-luminance region, i.e., $\overline{H}-\overline{M}$, to determine a color of the light source. A color temperature of the light source may correspondingly be determined according to the color of the light source. In some embodiments, the operation that the color temperature of the light source is determined according to the color of the light source may specifically be implemented as follows: the color temperature of the light source is determined according to the color of the light source and a correspondence between a color of a light source and a color temperature of the light source. The correspondence between the color of the light source and the color temperature of the light source may be a mapping table and/or a color temperature curve (as illustrated in FIG. 12). Specifically, in an embodiment, images may be acquired under standard light boxes of which color temperatures are 3,000K, 4,000K, 5,000K, 6,000K, . . . respectively, corresponding values of $\overline{H}-\overline{M}$ under different color temperatures are calculated, and thus a mapping table or color temperature curve between $\overline{H}-\overline{M}$ and color temperatures of light sources may be formed. The color temperature curve or the mapping table may be stored in a local database. In the embodiments of the disclosure, after $\overline{H}-\overline{M}$ is calculated, the color temperatures of the corresponding light sources may be queried from the color temperature curve or the mapping table. Then, corresponding white balance parameters may be found according to the color temperatures of the light sources and a correspondence between a color temperature of a light source and white balance parameters, and thus white balance processing may be performed on the images according to the white balance parameters.

In some embodiments, a primary color channel refers to a color channel and, for example, includes at least one of an R channel, a Gr channel, a Gb channel or a B channel. In some embodiments, a pixel value of the G channel may be obtained based on a pixel value of the Gr channel and a pixel value of the Gb channel. A pixel average may refer to an arithmetic mean of pixel values. In an example, pixel averages (Ravg, Gavg, Bavg) of each primary color channel of the high-luminance region are (200, 210, 220), pixel averages (Ravg, Gavg, Bavg) of each primary color channel of the medium-luminance region are (160, 180, 190), and then color channels (R, G, B) of the light source are (200−160, 210−180, 220−190), i.e., (40, 30, 30).

Therefore, the color of the light source may be determined as red.

Figure 13:
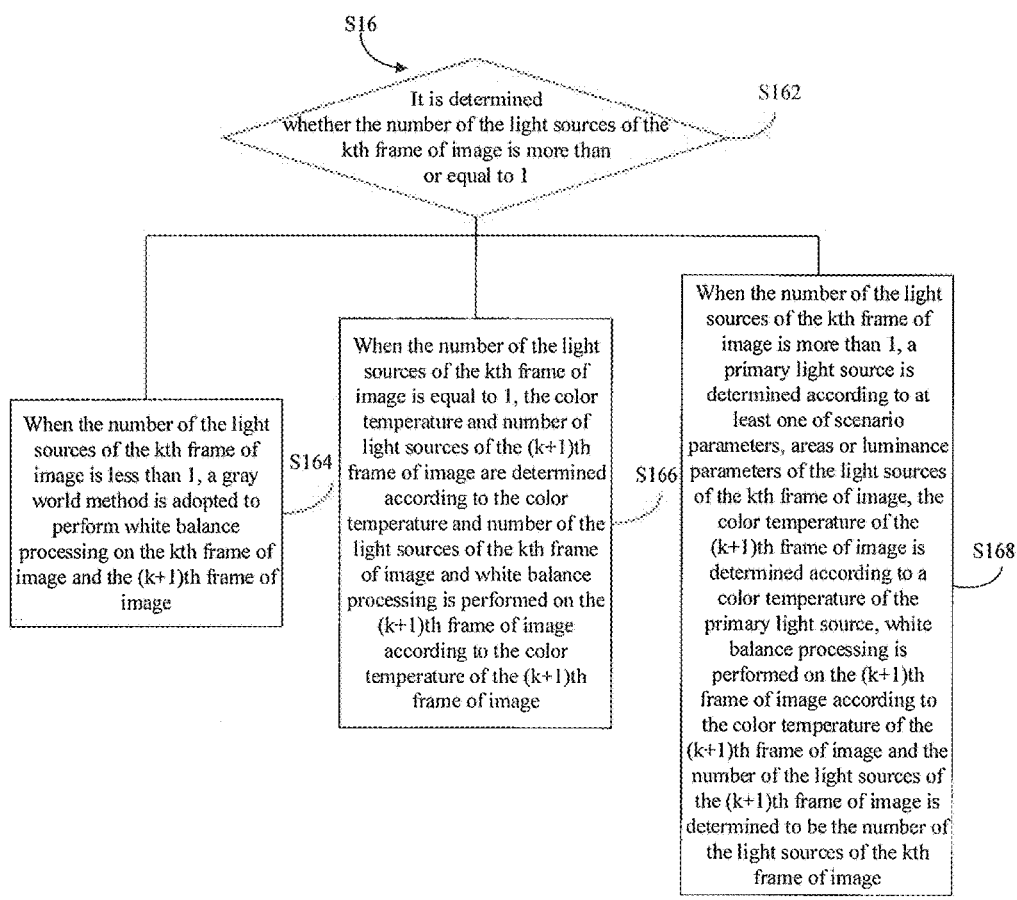
FIG. 13 is a schematic flowchart of an image processing method according to some embodiments of the disclosure.

Referring to FIG. 13, in some embodiments, the operation at block S16 further includes the following actions at blocks S162 to S168.

At block S162, it is determined whether the number of the light sources of the kth frame of image is more than or equal to 1.

At block S164, when the number of the light sources of the kth frame of image is less than 1, a gray world method is adopted to perform white balance processing on the kth frame of image and the (k+1)th frame of image.

At block S166, when the number of the light sources of the kth frame of image is equal to 1, the color temperature and number of the light sources of the (k+1)th frame of image are determined according to a color temperature and number of the light sources of the kth frame of image, and white balance processing is performed on the (k+1)th frame of image according to the color temperature of the (k+1)th frame of image.

At block S168, when the number of the light sources of the kth frame of image is more than 1, a primary light source is determined according to at least one of scenario parameters, areas or luminance parameters of the light sources of the kth frame of image, the color temperature of the (k+1)th frame of image is determined according to the color temperature of the primary light source, white balance processing is performed on the (k+1)th frame of image according to the color temperature of the (k+1)th frame of image, and the number of the light sources of the (k+1)th frame of image is determined to be the number of the light sources of the kth frame of image. In the example, the scenario parameters include image shooting time and signal strength of a Global Positioning System (GPS) and the luminance parameters include luminance of multiple light sources.

Figure 14:
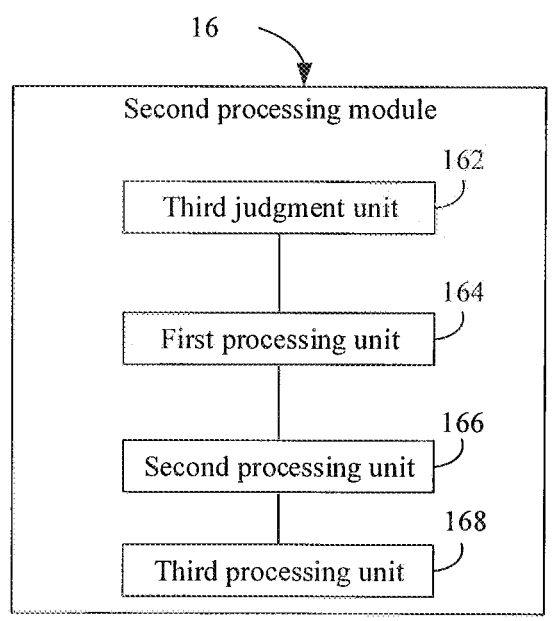
FIG. 14 is a schematic diagram of a second processing module according to some embodiments of the disclosure.

Referring to FIG. 14, in some embodiments, the second processing module 16 includes a third judgment unit 162, a first processing unit 164, a second processing unit 166 and a third processing unit 168. The third judgment unit 162 may be configured to judge whether the number of the light sources of the kth frame of image is more than or equal to 1. The first processing unit 164 may be configured to, when the number of the light sources of the kth frame of image is less than 1, adopt a gray world method to perform white balance processing on the kth frame of image and the (k+1)th frame of image. The second processing unit 166 may be configured to, when the number of the light sources of the kth frame of image is equal to 1, determine the color temperature and number of the light sources of the (k+1)th frame of image according to a color temperature and number of the light sources of the kth frame of image and perform white balance processing on the (k+1)th frame of image according to the color temperature of the (k+1)th frame of image. The third processing unit 168 may be configured to, when the number of the light sources of the kth frame of image is more than 1, determine a primary light source according to at least one of scenario parameters, areas or luminance parameters of the light sources of the kth frame of image, determine the color temperature of the (k+1)th frame of image according to the color temperature of the primary light source, perform white balance processing on the (k+1)th frame of image according to the color temperature of the (k+1)th frame of image and determine the number of the light sources of the (k+1)th frame of image to be the number of the light sources of the kth frame of image. In the example, the scenario parameters include image shooting time and signal strength of a Global Positioning System (GPS) and the luminance parameters include luminance of multiple light sources.

That is, the operation at block S162 may be implemented by the third judgment unit 162, the operation at block S164 may be implemented by the first processing unit 164, the operation at block S166 may be implemented by the second processing unit 166 and the operation at block S168 may be implemented by the third processing unit 168.

Therefore, when the kth frame of image does not include any light source (i.e., the number of the light sources is less than 1), the gray world method is adopted to perform white balance processing. When the kth frame of image includes only one light source, the color temperature of the (k+1)th frame of image is determined according to the color temperature of the light source. When the (k+1)th frame of image includes multiple light sources, the primary light source is determined according to at least one of scenario parameters, respective areas or luminance parameters of the multiple light sources, and the color temperature of the (k+1)th frame of image is determined according to the color temperature of the primary light source. Then, white balance processing is performed on the (k+1)th frame of image according to the color temperature of the (k+1)th frame of image and the number of the light sources of the (k+1)th frame of image is determined to be the number of the light sources of the kth frame of image. That is, the color temperature and number of the light sources of the kth frame of image are both assigned to the (k+1)th frame of image. When differences between the numbers of the light sources of multiple frames of images after the (k+1)th frame of image and the number of the light sources of the kth frame are not equal to 0, white balance processing may be performed according to the color temperature of the kth frame of image. In such a manner, after the number of the light sources changes, the color temperature for white balance processing may be locked until the number of the light sources returns to the original, i.e., the number of the light sources of the kth frame. Therefore, color temperature jump of a preview image caused by a change in the number of the light sources is avoided, and a user experience is improved.

Figure 15:
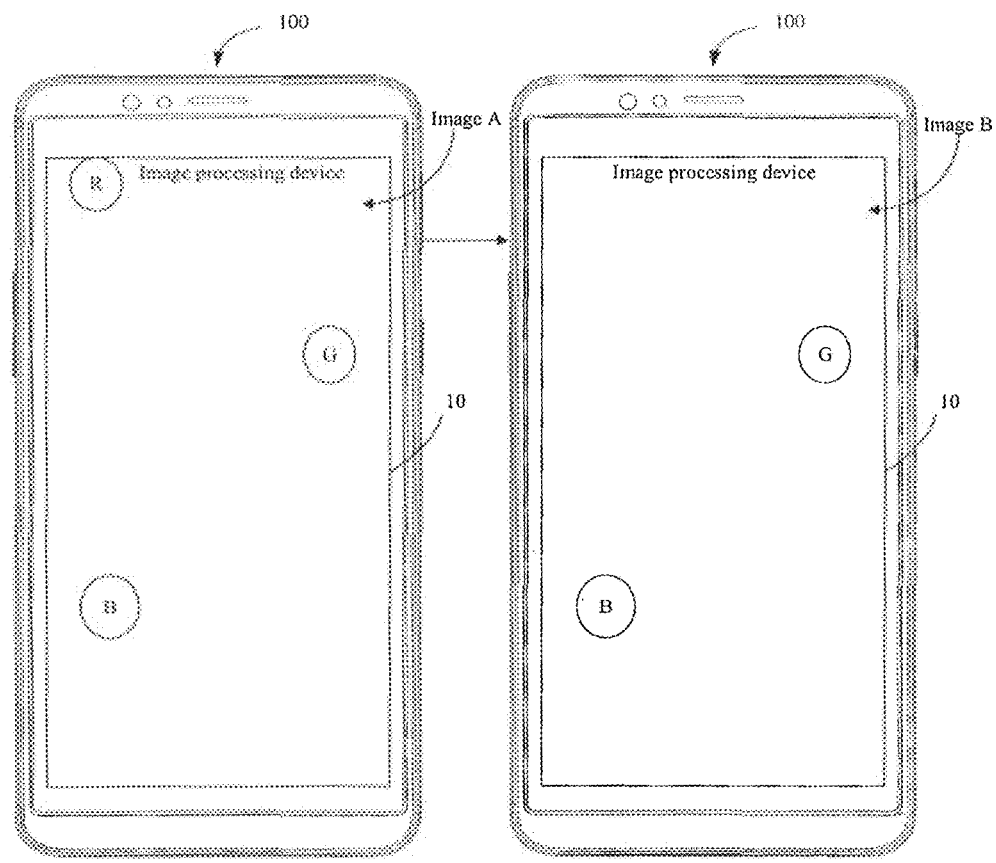
FIG. 15 is a schematic diagram of a scenario of an image processing method according to some embodiments of the disclosure.

Specifically, as illustrated in FIG. 15, when the computer device 100 (for example, a mobile phone) shoots an image, there are three light sources in the image, which are a light source R, a light source G and a light source B respectively. When a user shakes, the light source R is out of the image and the image A is changed to an image B. In such a case, a tone of the image B may jump. For preventing image tone jump caused by the change in the light sources, the image processing device 10 of the mobile phone detects a difference between the numbers of the light sources of two continuous frame images and, when the difference between the numbers of the light sources is not equal to 0, indicating that the number of the light sources of the latter frame of image changes, performs white balance regulation on the latter frame of image by using a color temperature of the former frame of image. In this case, a tone of the image may not jump and, instead, is substantially kept consistent with a tone of the former frame of image. Moreover, during white balance, the number of the light sources of the latter frame of image is set to be the number of the light sources of the former frame of image, so as to avoid the condition that a tone of the next of the latter frame of image jumps due to a misjudgment when the number of the light sources of the next of the latter frame of image is the same as the number of the light sources of the latter frame of image.

In some embodiments, the number of the light sources is manually adjusted by the user to be decreased or increased to obtain an image with higher quality and does not return to the number of the light sources before the change. For this condition, a predetermined frame number h may be set and white balance regulation is performed according to a color temperature of a (k+1)th frame of image when a difference between the number of the light sources of the (k+h)th and the number of the light sources of the kth frame of image is kept unequal to 0. For example, as for a certain (for example, (k+x)th) frame of image between the kth frame and the (k+h)th frame, when a difference between the number of the light sources of the (k+h)th frame of image and the number of the light sources of the kth frame of image is equal to 0, the (k+x)th frame is taken as a reference again. When a difference between the number of the light sources of a (k+x+h)th frame of image and the number of the light sources of the (k+x)th frame of image is not equal to 0, white balance regulation is performed on a color temperature of the (k+x+h)th frame according to the color temperature of the (k+x+h)th frame of image. That is, when the number of the light sources of an image after the predetermined frame number is still different from the number of the light sources of the kth frame of image, white balance regulation is not performed by using the color temperature of the kth frame of image all the time, and instead, white balance regulation is automatically performed on the present image according to a color temperature of the present image.

In such a manner, it is intelligently judged whether the number of the light sources changes due to active regulation of the user or accidental shaking, so as to avoid the condition that white balance is performed on all images by use of the same color temperature once the number of the light sources changes and does not return to the number of the light sources before the change when the user photographs. That is, it may avoid the case that active regulation of the user changes the number of the light sources but may not achieve accurate white balance. Not only is the problem of frequent image tone change caused by the fact that the light sources are randomly incident and emergent solved, but also influence on a normal shooting experience of the user may be avoided.

In some embodiments, the operation that the gray world method is adopted to process the image may include the following actions.

Values of primary color channels of all pixels of the image are counted.

Averages of the values of the three primary color channels (R, G, B) are calculated.

White balance regulation values of the channels R, G and B are determined according to the averages.

White balance regulation is performed on the image according to the white balance regulation values.

Specifically, the pixel averages ($R_{avg}$, $G_{avg}$, $B_{avg}$) of the primary color channels of the image are obtained by calculating data of the primary color channels of the image and then the white balance regulation values $K/P_{avg}$, $K/G_{avg}$ and $K/B_{avg}$ of each channel are calculated according to the averages, in which $K=(R_{avg}, G_{avg}, B_{avg})/3$. In such a manner, white balance processing may be performed on the whole image according to the white balance regulation values for the values of the primary color channels.

Therefore, white balance processing may be performed on the image under the condition of no light source.

In some embodiments, a primary light source is determined according to at least one of scenario parameters, respective areas or luminance parameters of multiple light sources.

Figure 16:
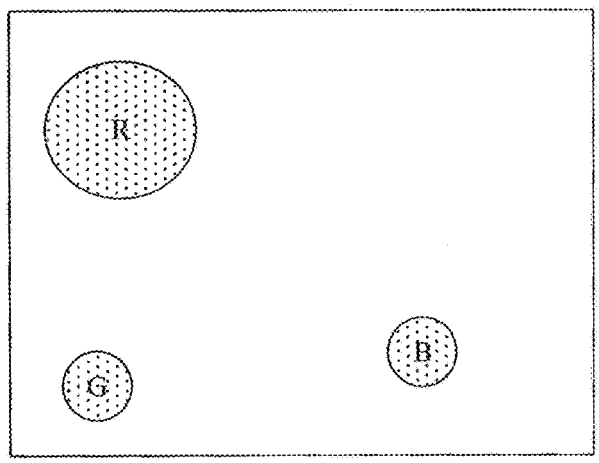
FIG. 16 is a schematic diagram of a scenario of an image processing method according to some embodiments of the disclosure.

A specific period where present time is located may be distinguished according to image shooting time. A specific position where the user may shoot in the present period may be determined through a timetable habit, stored in the local database, of the user. For example, the user usually has lunch in a dining room at 12 o'clock and the user usually reads books in a living room after 8 p.m. In this way, it may be substantially determined whether the user is located in an indoor environment, an outdoor environment or a specific scenario according to the image shooting time. In addition, outdoor GPS signal strength is usually higher than indoor GPS signal strength. Therefore, it may be substantially distinguished whether the user is located in the indoor environment or the outdoor environment according to the GPS signal strength. It can be understood that a color temperature of an indoor light source is usually lower than 5,000K. For example, a color temperature of a tungsten filament lamp is 2,760-2,900K and a color temperature of a flashlight is 3,800K. A color temperature of an outdoor light source is usually higher than 5,000K. For example, a color temperature of the midday sunlight is 5,000K and a color temperature of the blue sky is 10,000K. Therefore, it may be substantially determined whether a present color temperature should be higher than 5,000K or lower than 5,000K according to the indoor environment or outdoor environment where the user is located. As illustrated in FIG. 16, for example, a color temperature of a light source R is 4,500K, a color temperature of a light source G is 3,500K, a color temperature of a light source B is 7,000K, and it is determined that the present color temperature should be 5,000K according to a scenario parameter. It is apparent that the light source R is closest to the present color temperature of the scenario and thus the light source R is determined as a primary light source. Therefore, the primary light source may be determined.

When the primary light source is determined according to the respective areas of the multiple light sources, the areas of the multiple light sources may be compared and the light source with the largest area is selected as the primary light source. For example, in FIG. 16, an area of the light source R is larger than that of the light source G and larger than that of the light source B, and thus the light source R is determined as the primary light source.

Figure 17:
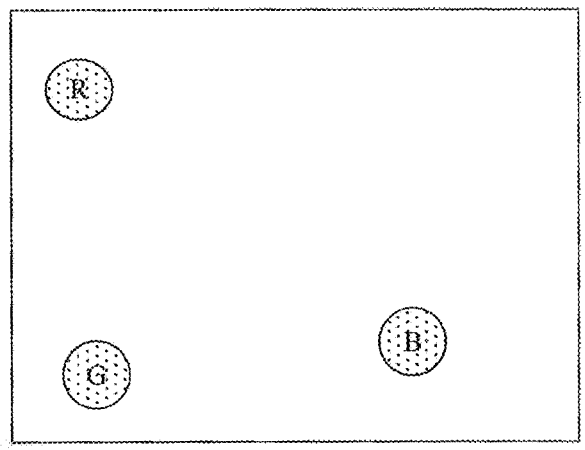
FIG. 17 is a schematic diagram of a scenario of an image processing method according to some embodiments of the disclosure.

When the primary light source is determined according to respective luminance of the multiple light sources, it can be understood that the light source with higher luminance usually has greater influence on the whole image. As illustrated in FIG. 17, when areas of light sources are the same, luminance of the light source R is 150, luminance of the light source G is 100, luminance of the light source B is 200, and then the light source B is determined as a primary light source. In such a case, when the areas of the light sources are the same, the light source with highest luminance is determined as the primary light source.

According to the image processing method of the embodiments of the disclosure, the primary light source may be determined according to a combination of the image shooting time of the multiple light sources and the GPS signal strength, or the primary light source may be determined according to the areas of the multiple light sources, or the primary light source may be determined according to a combination of the respective luminance of the multiple light sources and average luminance of the images, or the primary light source may be determined according to the areas of the multiple light sources and the combination of the image shooting time of the multiple light sources and the GPS signal strength, or the primary light source may be determined according to the combination of the image shooting time of the multiple light sources and the GPS signal strength and the combination of the respective luminance of the multiple light sources and the average luminance of the images, or the primary light source may be determined according to the areas of the multiple light sources and the combination of the respective luminance of the multiple light sources and the average luminance of the images, or the primary light source may be determined according to the combination of the image shooting time of the multiple light sources and the GPS signal strength, the areas and the combination of the respective luminance of the multiple light sources and the average luminance of the images.

In at least one embodiment, according to the image processing method, the primary light source may be determined according to the combination of the image shooting time of the multiple light sources and the GPS signal strength, the areas and the combination of the respective luminance and the average luminance of the images. Different weights may be set for the combination of the image shooting time of the multiple light sources and the GPS signal strength, the areas and the combination of the respective luminance and the average luminance of the images respectively. In such a manner, the primary light source may be selected accurately, and a white balance effect expected by the user may be achieved better when white balance processing is performed on the image.

Figure 18:
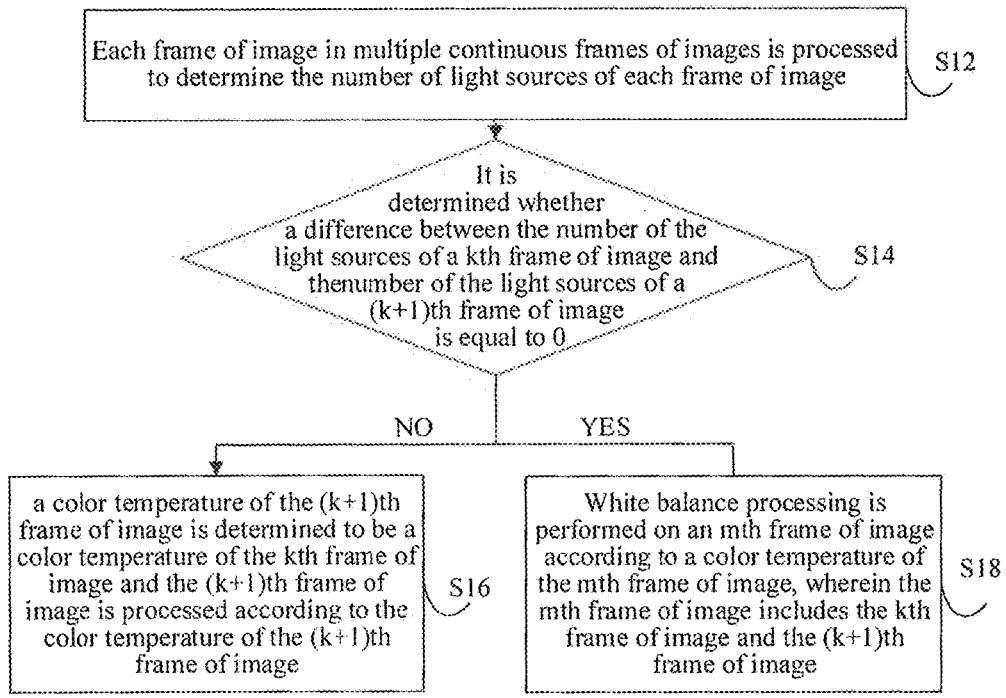
FIG. 18 is a schematic flowchart of an image processing method according to some embodiments of the disclosure.

Referring to FIG. 18, in some embodiments, the image processing method further includes the operation at block s18.

At block S18, when the difference is equal to 0, white balance processing is performed on an mth frame of image according to a color temperature of the mth frame of image, wherein the mth frame of image includes the kth frame of image and the (k+1)th frame of image.

In the embodiments, m may be a positive integer and m≥k

Figure 19:
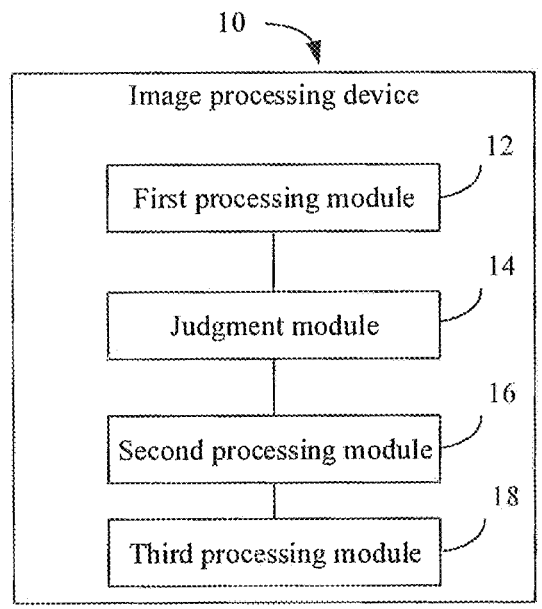
FIG. 19 is a schematic diagram of an image processing device according to some embodiments of the disclosure.

Referring to FIG. 19, in some embodiments, the image processing device further includes a third processing module 18. The third processing module may be configured to, when the difference is equal to 0, perform white balance processing on an mth frame of image according to a color temperature of the mth frame of image, wherein the mth frame of image includes the kth frame of image and the (k+1)th frame of image.

That is, the operation at block S18 may be implemented by the third processing module 18.

In such a manner, through determining the change in the number of the light sources, it may be avoided that white balance processing is performed according to the color temperature of the image after the number of the light sources returns to normal while image tone jump occurs during photographing. Therefore, white balance accuracy may be improved while avoiding image tone jump.

Figure 20:
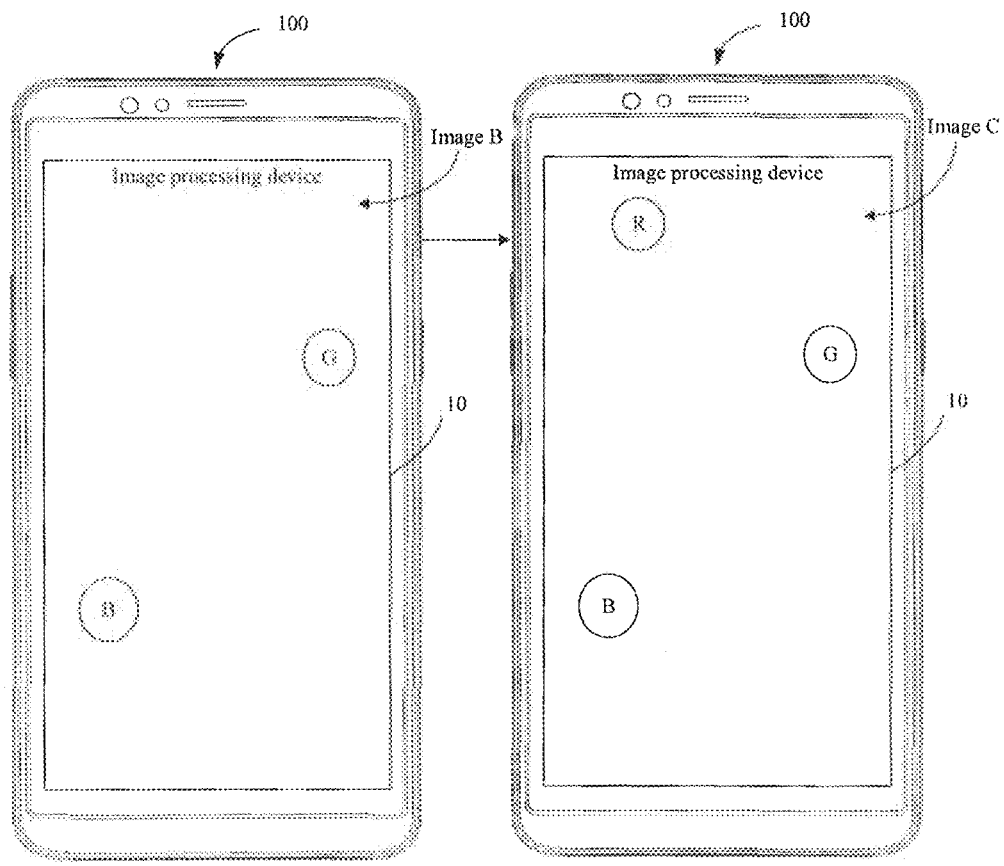
FIG. 20 is a schematic diagram of a scenario of an image processing method according to some embodiments of the disclosure.

Specifically, as illustrated in FIG. 15 and FIG. 20, the image acquired by the image processing device 10 is changed from the image A to the image B and then changed from the image B to an image C, and the light source R disappears from the image A and appears in the image C.

Since the number of light sources of the image B is obtained by assignment with the number of light sources of the image A and the number of the light sources of the image A is the same as the number of light sources of the image C, the number of the light sources of the image B is the same as the number of the light sources of the image C. It can be understood that there is no tone jump problem for a tone of the image C relative to a tone of the image B when the number of the light sources changes. In such a case, white balance processing may be performed on the present frame of image according to a color temperature of the present frame of image (the image C), such that a more accurate white-balanced image may be obtained under the condition of ensuring the user experience.

Figure 21:
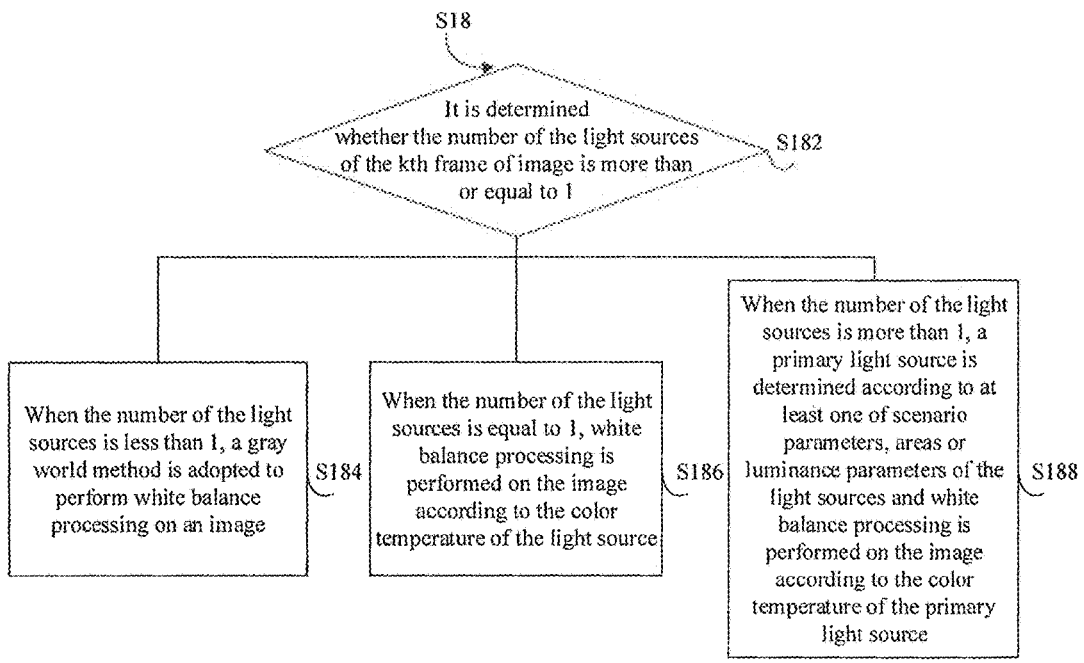
FIG. 21 is a schematic flowchart of an image processing method according to some embodiments of the disclosure.

Referring to FIG. 21, in some embodiments, the operation at block S18 includes the following actions at blocks S182 to S188.

At block S182, it is determined whether the number of the light sources is more than or equal to 1.

At block S184, when the number of the light sources is less than 1, the gray world method is adopted to perform white balance processing on the image.

At block S186, when the number of the light sources is equal to 1, white balance processing is performed on the image according to the color temperature of the light source.

At block S188, when the number of the light sources is larger than 1, the primary light source is determined according to at least one of the scenario parameters, areas or luminance parameters of the light sources and white balance processing is performed on the image according to the color temperature of the primary light source. In the example, the scenario parameters include the image shooting time and the GPS signal strength and the luminance parameters include the luminance of the multiple light sources.

Figure 22:
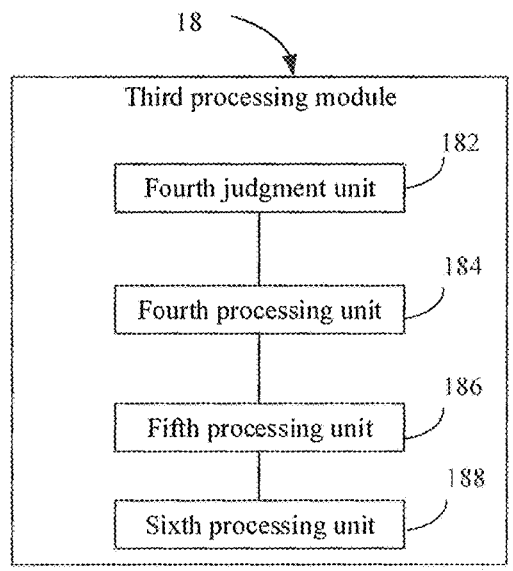
FIG. 22 is a schematic diagram of a third processing module according to some embodiments of the disclosure.

Referring to FIG. 22, in some embodiments, the third processing module 18 includes a fourth judgment unit 182, a fourth processing unit 184, a fifth processing unit 186 and a sixth processing unit 188. The fourth judgment unit 182 may be configured to judge whether the number of the light sources is more than or equal to 1. The fourth processing unit 184 may be configured to, when the number of the light sources is less than 1, adopt the gray world method to perform white balance processing on the image. The fifth processing unit 186 may be configured to, when the number of the light sources is equal to 1, perform white balance processing on the image according to the color temperature of the light source. The sixth processing unit 188 may be configured to, when the number of the light sources is larger than 1, determine the primary light source according to at least one of the scenario parameters, areas or luminance parameters of the light sources and perform white balance processing on the image according to the color temperature of the primary light source, wherein the scenario parameters include the image shooting time and the GPS signal strength and the luminance parameters include the luminance of the multiple light sources.

That is, the operation at block S182 may be implemented by the fourth judgment unit 182. The operation at block S184 may be implemented by the fourth processing unit 184. The operation at block S186 may be implemented by the fifth processing unit 186 and the operation at block S188 may be implemented by the sixth processing unit 188.

In such a manner, when the difference between the numbers of the light sources is equal to 0, it is determined whether the number of the light sources is more than or equal to 1. When there is no light source (i.e., the number of the light sources is less than 1), the gray world method is adopted to perform white balance processing. When the number of the light sources is equal to 1, white balance processing is performed according to the color temperature of the light source of the mth frame of image. When the number of the light sources is larger than 1, the primary light source is determined at first according to at least one of the scenario parameters, respective areas and luminance parameters of the light sources of the mth frame image and then white balance processing is performed according to the color temperature of the primary light source. The primary light source may be selected accurately, so that a good white balance processing effect is achieved.

An embodiment of the disclosure further provides a computer-readable storage medium. One or more nonvolatile computer-readable storage media includes a computer-executable instruction, and the computer-executable instruction is executed by one or more processors to enable the processor to execute the following operations at blocks S12 to S16.

At block S12, each frame of image in multiple continuous frames of images is processed to determine the number of light sources of each frame of image.

At block S14, it is determined whether a difference between the number of the light sources of a kth frame of image and the number of the light sources of a (k+1)th frame of image is equal to 0.

At block S16, responsive to determining that the difference is unequal to 0, a color temperature of the (k+1)th frame of image is determined to be a color temperature of the kth frame of image and the (k+1)th frame of image is processed according to the color temperature of the (k+1)th frame of image.

Figure 23:
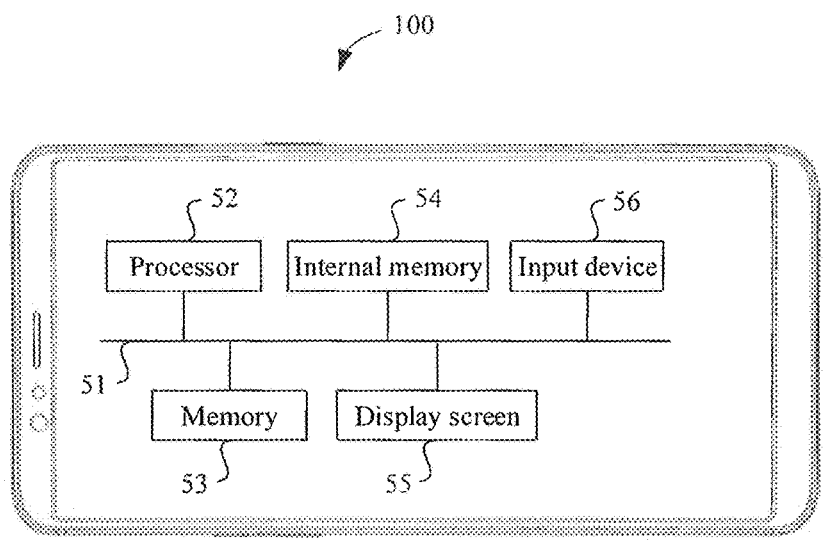
FIG. 23 is a schematic diagram of a computer device according to some embodiments of the disclosure.

FIG. 23 is an internal structure diagram of a computer device according to an embodiment of the disclosure. As illustrated in FIG. 23, the computer device 100 includes a processor 52, a memory 53 (for example, a nonvolatile storage medium), an internal memory 54, a display screen 55 and an input device 56, all of which are connected through a system bus 51. The memory 53 of the computer device 100 may store an operating system and a computer-readable instruction. The computer-readable instruction may be executed by the processor 52 to implement an image processing method of the embodiments of the disclosure. The processor 52 may be configured to provide calculation and control capability to support running of the whole computer device 100. The internal memory 53 of the computer device 100 may provide an environment for running of the computer-readable instruction in the memory 52. The display screen 55 of the computer device 100 may be a liquid crystal display screen, an electronic ink display screen or the like. The input device 56 may be a touch layer covering the display screen 55, may also be a key, a trackball or a touch pad arranged on a housing of the computer device 100 and may further be an external keyboard, a touch pad, a mouse or the like. The computer device 100 may be a mobile phone, a tablet computer, a notebook computer, a personal digital assistant, a wearable device (for example, a smart band, a smart watch, a smart helmet and smart glasses) or the like. Those skilled in the art may know that a structure illustrated in FIG. 23 is only a schematic diagram of a part of structure related to the solutions of the disclosure and not intended to limit the computer device 100 to which the solutions of the disclosure are applied. The computer device 100 may specifically include components more or less than those illustrated in the figure, or some components are combined or different component arrangements are adopted.

Figure 24:
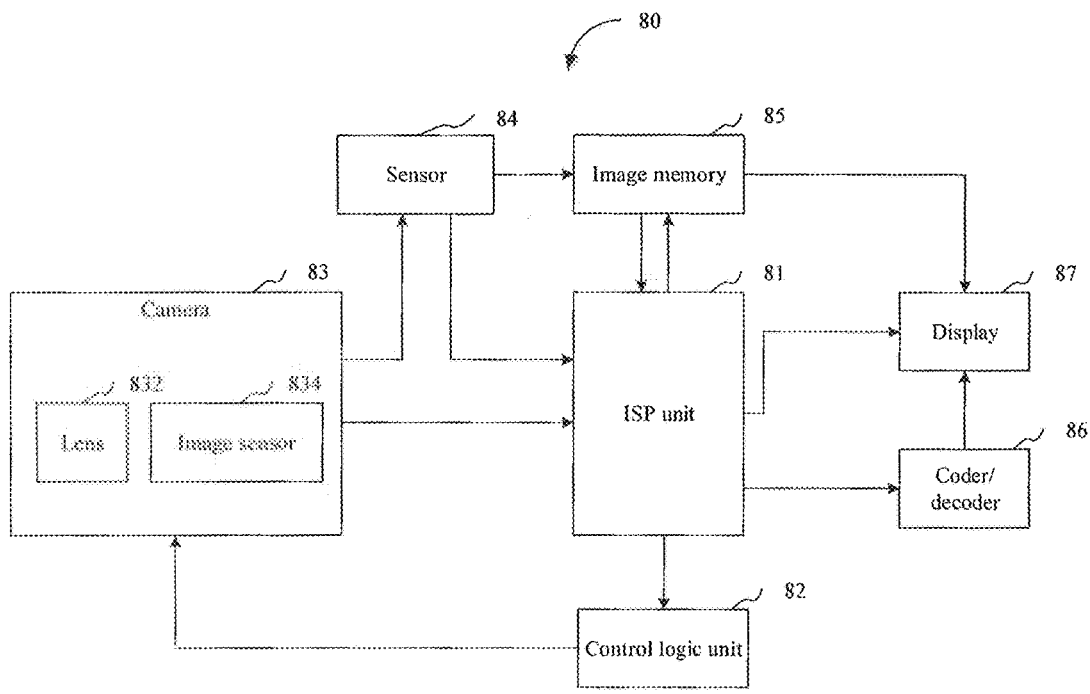
FIG. 24 is a schematic diagram of an image processing circuit according to some embodiments of the disclosure.

Referring to FIG. 24, the computer device 100 of the embodiments of the disclosure includes an image processing circuit 80. The image processing circuit 80 may be implemented by use of a hardware and/or software component, and may include various processing units defining an Image Signal Processing (ISP) pipeline. FIG. 24 is a schematic diagram of an image processing circuit 800 according to an embodiment of the disclosure. As illustrated in FIG. 24, aspects of an image processing technology related to the embodiments of the disclosure are illustrated only, for convenient description.

As illustrated in FIG. 24, the image processing circuit 80 may include an ISP unit 81 (the ISP unit 81 may be the processor 52 or part of the processor 52) and a control logic unit 82. Image data captured by a camera 83 may be processed by the ISP unit 81 at first, and the ISP unit 81 may analyze the image data to capture image statistical information available for determining one or more control parameters of the camera 83. The camera 83 may include one or more lenses 832 and an image sensor 834. The image sensor 834 may include a color filter array (for example, a Bayer filter), and the image sensor 834 may acquire light intensity and wavelength information captured by each imaging pixel and provide a set of original image data processed by the ISP unit 81. The sensor 84 (for example, a gyroscope) may provide acquired image processing parameters (for example, an anti-shake parameter) to the ISP unit 81 based on an interface type of the sensor 84. An interface of the sensor 84 may be a Standard Mobile Imaging Architecture (SMIA) interface, another serial or parallel camera interface or a combination of the interfaces.

In addition, the image sensor 834 may also send original image data to the sensor 84. The sensor 84 may provide the original image data to the ISP unit 81 based on the interface type of the sensor 84, or the sensor 84 stores the original image data in an image memory 85.

The ISP unit 81 may process the original image data pixel by pixel according to multiple formats. For example, each image pixel may have a bit depth of 8, 10, 12 or 14 bits. The ISP unit 81 may execute one or more image processing operations on the original image data and collect the image statistical information about the image data. The image processing operations may be executed according to the same or different bit depth accuracy.

The ISP unit 81 may further receive the image data from the image memory 85. For example, the interface of the sensor 84 may send the original image data to the image memory 85, and the original image data in the image memory 85 may be provided to the ISP unit 81 for processing. The image memory 85 may be the memory 53, a part of the memory 53, a storage device or an independent dedicated memory in electronic equipment, and may include a Direct Memory Access (DMA) feature.

When receiving the original image data from the interface of the image sensor 834 or from the interface of the image sensor 84 or from the image memory 85, the ISP unit 81 may execute one or more image processing operations, for example, time-domain filtering. The processed image data may be sent to the image memory 85 for other processing before displaying. The ISP unit 81 may receive the processed data from the image memory 85 and perform image data processing in an original domain and color spaces RGB and YCbCr on the processed data. The image data processed by the ISP unit 81 may be output to a display 87 (the display 87 may include the display screen 55) for a user to view and/or for further processing by a Graphics Processing Unit (GPU). In addition, output of the ISP unit 81 may further be sent to the image memory 85, and the display 87 may read the image data from the image memory 85. In an embodiment of the disclosure, the image memory 85 may be configured to implement one or more frame buffers. Moreover, the output of the ISP unit 81 may be sent to a coder/decoder 86 to code/decode the image data. The coded image data may be stored, and may be decompressed before being displayed on the display 87. The coder/decoder 86 may be implemented by a Central Processing Unit (CPU) or a GPU or a coprocessor.

The statistical information determined by the ISP unit 81 may be sent to the control logic unit 82. For example, the statistical information may include statistical information of automatic exposure, automatic white balance, automatic focusing, flashing detection, black level compensation, shading correction of the lens 832 and the like of the image sensor 834. The control logic unit 82 may include a processing component and/or microcontroller executing one or more routines (for example, firmware), and the one or more routines may determine the control parameters of the camera 83 and the control parameters of the ISP unit 81 according to the received statistical data. For example, the control parameters of the camera 83 may include a control parameter (for example, a gain, integral time for exposure control and the anti-shake parameter) for the sensor 84, a camera flashing control parameter, a control parameter (for example, a focal length for focusing or zooming) for the lens 832 or a combination of these parameters. The control parameters for the ISP unit may include a gain level and color correction matrix for automatic white balance and color regulation (for example, during RGB processing) and a shading correction paramuneter for the lens 832.

An image processing method is implemented by use of the image processing technology in FIG. 24 through the following operations at blocks S12 to S16.

At block S12, each frame of image in multiple continuous frames of images is processed to determine the number of light sources of each frame of image.

At block S14, it is determined whether a difference between the number of the light sources of a kth frame of image and the number of the light sources of a (k+1)th frame of image is equal to 0.

At block S16, responsive to determining that the difference is unequal to 0, a color temperature of the (k+1)th frame of image is determined to be a color temperature of the kth frame of image and the (k+1)th frame of image is processed according to the color temperature of the (k+1)th frame of image.

Those of ordinary skill in the art should understand that all or part of the flows in the method of the abovementioned embodiments may be completed through related hardware instructed by a computer program, and the program may be stored in a nonvolatile computer-readable storage medium. When the program is executed, the flows of each method embodiment may be included. The storage medium may be a magnetic disk, an optical disk, a Read-Only Memory (ROM) and the like.

The abovementioned embodiments only describe some implementation modes of the disclosure and are specifically described in detail, but it should not be understood as limits to the scope of the disclosure. It should be pointed out that those of ordinary skill in the art may further make a plurality of transformations and improvements without departing from the concept of the disclosure and all of these shall fall within the scope of protection of the disclosure. Therefore, the scope of patent protection of the disclosure should be subject to the appended claims.

The invention claimed is:

1. An image processing method, comprising:
processing each frame of image in multiple continuous frames of images to determine a number of light sources of each frame of image;
determining whether a difference between a number of light sources of a kth frame of image and a number of light sources of a (k+1)th frame of image is equal to 0, k being a positive integer; and
responsive to determining that the difference is unequal to 0, determining a color temperature of the (k+1)th frame of image to be a color temperature of the kth frame of image, and processing the (k+1)th frame of image according to the color temperature of the (k+1)th frame of image.

2. The image processing method of claim 1, wherein the operation of processing each frame of image in the multiple continuous frames of images to determine the number of the light sources of each frame of image comprises:
dividing each frame of image into multiple regions;
for each of the multiple regions, determining whether the region is a target region comprising a light source according to a histogram of the region;
responsive to determining that the region is the target region comprising light sources, determining whether there are multiple target regions adjacent to the region;
responsive to determining that there are multiple target regions adjacent to the region, splicing the multiple target regions into a light source;
responsive to determining that there are no target regions adjacent to the region, determining the target region as a light source; and
counting the light sources.

3. The image processing method of claim 2, wherein determining whether the region is a target region comprising a light source according to a histogram of the region comprises:
determining whether a proportion of a number of pixels with pixel values exceeding a predetermined value in the region exceeds a predetermined value according to the histogram of the region; and
responsive to determining that the proportion of the number of pixels exceeds the predetermined value, determining the region to be the target region comprising a light source.

4. The image processing method of claim 1, wherein the operation of processing each frame of image in the multiple continuous frames of images to determine the number of the light sources of each frame of image further comprises:
determining a high-luminance region and a medium-luminance region according to a luminance distribution extending outwards from a center of a light source along a radial direction of the light source; and
determining a color of the light source by subtracting pixel averages of primary color channels of the medium-luminance region from pixel averages of primary color channels of the high-luminance region.

5. The image processing method of claim 4, further comprising: after determining the color of the light source,
obtain a color temperature of the light source corresponding to the determined color of the light source based on a preset correspondence between obtain colors temperature of the light source and color temperatures of the light source.

6. The image processing method of claim 5, wherein the operation of determining, responsive to determining that the difference value is unequal to 0, the color temperature of the (k+1)th frame of image to be the color temperature of the kth frame of image and processing the (k+1)th frame of image according to the color temperature of the (k+1)th frame of image comprises:
determining whether the number of the light sources of the kth frame of image is more than or equal to 1;
responsive to determining that the number of the light sources of the kth frame of image is less than 1, adopting a gray world method to perform white balance processing on the kth frame of image and the (k+1)th frame of image;
responsive to determining that the number of the light sources of the kth frame of image is equal to 1, determining the color temperature and number of the light sources of the (k+1)th frame of image according to the color temperature and number of the light sources of the kth frame of image and performing white balance processing on the (k+1)th frame of image according to the color temperature of the (k+1)th frame of image; and
responsive to determining that the number of the light sources of the kth frame of image is more than 1, determining a primary light source according to at least one of scenario parameters, areas or luminance parameters of the light sources of the kth frame of image, determining the color temperature of the (k+1)th frame of image according to a color temperature of the primary light source, performing white balance processing on the (k+1)th frame of image according to the color temperature of the (k+1)th frame of image, and determining the number of the light sources of the (k+1)th frame of image to be the number of the light sources of the kth frame of image.

7. The image processing method of claim 6, wherein the scenario parameters comprise image shooting time and signal strength of a Global Positioning System (GPS), and the luminance parameters comprise luminance of multiple light sources.

8. The image processing method of claim 1, further comprising:
responsive to determining that the difference is equal to 0, performing white balance processing on an mth frame of image according to a color temperature of the mth frame of image, wherein the mth frame of image comprises the kth frame of image and the (k+1)th frame of image, m being a positive integer and m≥k.

9. The image processing method of claim 8, wherein the operation of performing, responsive to determining that the difference value is equal to 0, white balance processing on the mth frame of image according to the color temperature of the mth frame of image comprises:
determining whether the number of the light sources is more than or equal to 1;
responsive to determining that the number of the light sources is less than 1, adopting a gray world method to perform white balance processing on the mth frame of image;
responsive to determining that the number of the light sources is equal to 1, performing white balance processing on the mth frame of image according to a color temperature of the light source; and
responsive to determining that the number of the light sources is more than 1, determining a primary light source according to at least one of scenario parameters, areas or luminance parameters of the light sources and performing white balance processing on the mth frame of image according to a color temperature of the primary light source, wherein the scenario parameters comprise image shooting time and signal strength of a GPS, and the luminance parameters comprise luminance of multiple light sources.

10. The image processing method of claim 1, further comprising:
when a difference between a number of light sources of a (k+h)th frame of image and the number of the light sources of the kth frame of image is kept unequal to 0, performing white balance processing on the (k+1)th frame of image according to a color temperature of the (k+1)th frame of image, h being a preset value.

11. An image processing device, comprising: a memory and a processor, the memory storing one or more computer programs that, when executed by the processor, cause the processor to execute operations comprising:
processing each frame of image in multiple continuous frames of images to determine a number of light sources of each frame of image;
determining whether a difference between a number of light sources of a kth frame of image and a number of light sources of a (k+1)th frame of image is equal to 0, k being a positive integer; and
responsive to determining that the difference is unequal to 0, determining a color temperature of the (k+1)th frame of image to be a color temperature of the kth frame of image and process the (k+1)th frame of image according to the color temperature of the (k+1)th frame of image.

12. The image processing device of claim 11, wherein the operation of processing each frame of image in the multiple continuous frames of images to determine the number of the light sources of each frame of image comprises:
dividing each frame of image into multiple regions;
for each of the multiple regions, determining whether the region is a target region comprising a light source according to a histogram of the region;
responsive to determining that the region is the target region comprising light sources, determining whether there are multiple target regions adjacent to the region;
responsive to determining that there are multiple target regions adjacent to the region, splicing the multiple target regions into a light source;
responsive to determining that there are no adjacent target regions adjacent to the region, determining the target regions as a light source; and
counting the light sources.

13. The image processing device of claim 12, wherein determining whether the region is a target region comprising a light source according to a histogram of the region comprises:
determining whether a proportion of a number of pixels with pixel values exceeding a predetermined value in the region exceeds a predetermined value according to the histogram of the region; and
responsive to determining that the proportion of the number of pixels exceeds the predetermined value, determining the region to be the target region comprising a light source.

14. The image processing device of claim 11, wherein the operation of processing each frame of image in the multiple continuous frames of images to determine the number of the light sources of each frame of image further comprises:
determining a high-luminance region and a medium-luminance region according to a luminance distribution extending outwards from a center of a light source along a radial direction of the light source; and
determining a color of the light source by subtracting pixel averages of primary color channels of the medium-luminance region from pixel averages of primary color channels of the high-luminance region.

15. The image processing device of claim 14, wherein the operations further comprise: after determining the color of the light source,
obtain a color temperature of the light source corresponding to the determined color of the light source based on a preset correspondence between obtain colors temperature of the light source and color temperatures of the light source.

16. The image processing device of claim 15, wherein the operation of determining, responsive to determining that the difference value is unequal to 0, the color temperature of the (k+1)th frame of image to be the color temperature of the kth frame of image and processing the (k+1)th frame of image according to the color temperature of the (k+1)th frame of image comprises:
determining whether the number of the light sources of the kth frame of image is more than or equal to 1;
responsive to determining that the number of the light sources of the kth frame of image is less than 1, adopting a gray world method to perform white balance processing on the kth frame of image and the (k+1)th frame of image;
responsive to determining that the number of the light sources of the kth frame of image is equal to 1, determining the color temperature and number of the light sources of the (k+1)th frame of image according to the color temperature and number of the light sources of the kth frame of image, and performing white balance processing on the (k+1)th frame of image according to the color temperature of the (k+1)th frame of image; and
responsive to determining that the number of the light sources of the kth frame of image is more than 1, determining a primary light source according to at least one of scenario parameters, areas or luminance parameters of the light sources of the kth frame of image, determining the color temperature of the (k+1)th frame of image according to a color temperature of the primary light source, performing white balance processing on the (k+1)th frame of image according to the color temperature of the (k+1)th frame of image, and determining the number of the light sources of the (k+1)th frame of image to be the number of the light sources of the kth frame of image, wherein the scenario parameters comprise image shooting time and signal strength of a Global Positioning System (GPS), and the luminance parameters comprise luminance of multiple light sources.

17. The image processing device of claim 11, wherein the operations further comprise:
responsive to determining that the difference is equal to 0, performing white balance processing on an mth frame of image according to a color temperature of the mth frame of image, wherein the mth frame of image comprises the kth frame of image and the (k+1)th frame of image, m being a positive integer and m≥k.

18. The image processing device of claim 17, wherein the operation of performing, responsive to determining that the difference value is equal to 0, white balance processing on the mth frame of image according to the color temperature of the mth frame of image comprises:
determining whether the number of the light sources is more than or equal to 1 or not;

responsive to determining that the number of the light sources is less than 1, adopting a gray world method to perform white balance processing on the mth frame image;

responsive to determining that the number of the light sources is equal to 1, performing white balance processing on the mth frame image according to a color temperature of the light source; and responsive to determining that the number of the light sources is more than 1, determining a primary light source according to at least one of scenario parameters, areas or luminance parameters of the light sources and performing white balance processing on the mth frame image according to a color temperature of the primary light source, wherein the scenario parameters comprise image shooting time and signal strength of a GPS, and the luminance parameters comprise luminance of multiple light sources.

19. The image processing device of claim 11, wherein the operations further comprise:

when a difference between a number of light sources of a (k+h)th frame of image and the number of the light sources of the kth frame of image is kept unequal to 0, performing white balance processing on the (k+1)th frame of image according to a color temperature of the (k+1)th frame of image, h being a preset value.

20. A non-transitory computer-readable storage medium, comprising a computer-executable instruction that, when executed by one or more processors, causes the processor to execute an image processing method, the method comprising:

processing each frame of image in multiple continuous frames of images to determine a number of light sources of each frame of image;

determining whether a difference between a number of light sources of a kth frame of image and a number of light sources of a (k+1)th frame of image is equal to 0, k being a positive integer; and responsive to determining that the difference is unequal to 0, determining a color temperature of the (k+1)th frame of image to be a color temperature of the kth frame of image, and processing the (k+1)th frame of image according to the color temperature of the (k+1)th frame of image.

* * * * *